(12) United States Patent
Shah et al.

(10) Patent No.: US 8,890,588 B2
(45) Date of Patent: Nov. 18, 2014

(54) CIRCUITS AND METHODS FOR ASYMMETRIC AGING PREVENTION

(71) Applicant: Texas Instruments Incorporated, Dallas, TX (US)

(72) Inventors: Kalpesh Amrutlal Shah, Bangalore (IN); Arvind Kumar, Bangalore (IN); Francisco Adolfo Cano, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/852,326

(22) Filed: Mar. 28, 2013

(65) Prior Publication Data

US 2014/0292383 A1 Oct. 2, 2014

(51) Int. Cl.
*H03L 7/00* (2006.01)
*H03L 7/24* (2006.01)

(52) U.S. Cl.
CPC .................................... *H03L 7/24* (2013.01)
USPC .............................. 327/143; 327/291; 327/77

(58) Field of Classification Search
USPC ............ 327/142, 143, 198, 291–299, 77, 78
See application file for complete search history.

(56) References Cited

U.S. PATENT DOCUMENTS

| | | | | |
|---|---|---|---|---|
| 5,889,709 | A * | 3/1999 | Fukuda | 365/154 |
| 6,147,537 | A * | 11/2000 | Sasaki | 327/298 |
| 6,809,556 | B1 * | 10/2004 | Bronfer et al. | 327/99 |
| 7,038,506 | B2 * | 5/2006 | Om et al. | 327/145 |
| 7,055,051 | B2 * | 5/2006 | Shinkawa | 713/500 |
| 2011/0025383 | A1 * | 2/2011 | De Martini et al. | 327/143 |
| 2012/0274146 | A1 * | 11/2012 | Laur et al. | 307/82 |
| 2014/0002160 | A1 * | 1/2014 | Priel et al. | 327/198 |

* cited by examiner

*Primary Examiner* — Lincoln Donovan
*Assistant Examiner* — Thomas Skibinski
(74) *Attorney, Agent, or Firm* — John Pesstto; Frederick J. Telecky, Jr.

(57) ABSTRACT

In an embodiment, a circuit configured for asymmetric ageing prevention in an integrated circuit (IC) comprises a primary clock configured to generate a primary clock signal, a secondary clock configured to generate a secondary clock signal, a state determination circuit, and a control circuit. The state determination circuit is configured to determine a current operating state associated with at least one of a primary clock condition and a power-on-reset condition in the IC. The control circuit is configured to generate a control signal in response to a determination of an first operating state. The control signal is configured to facilitate a transition from the primary clock to the secondary clock upon determination of the first operating state, and a transition from a safe operating mode to a normal operating mode upon determination of a second operating state. The secondary clock is associated with a safe operating mode of the IC.

18 Claims, 8 Drawing Sheets

CIRCUITS AND METHODS FOR ASYMMETRIC AGING PREVENTION

TECHNICAL FIELD

Embodiments of the disclosure relate to asymmetric aging prevention.

BACKGROUND

In accordance with an exemplary scenario, it is noted that, with the growing popularity of integrated circuits (ICs) in various electronic applications, such as central processing units (CPUs), application specific integrated circuit (ASICs), and the like, the speed and complexity of ICs have increased significantly. Indeed, one exemplary scenario provides that ICs are increasingly utilized for the development of dense, high-performance, IC based devices that may integrate all (or nearly all) of the components of a complex electronic system into a single chip. Such devices may be referred to as system-on-chip (SoC) devices.

In accordance with an exemplary scenario, when SoC devices are held or maintained in a static state for relatively long periods of time, they develop a bias toward a propagation of data on, through, along or from specific edges, which may be referred to as Negative Bias Temperature Instability (NBTI) and/or Positive Bias Temperature Instability (PBTI). As a result, the device may experience switching failures (e.g., unpredictable behavior of the chip/device), thereby causing an asymmetric ageing phenomenon, which may be detrimental for circuits incorporating the SoC.

SUMMARY

Circuits and methods for asymmetric ageing prevention in an integrated circuit (IC) are disclosed. In an embodiment, a circuit configured for asymmetric ageing prevention comprises a primary clock, a secondary clock, a state determination circuit, and a control circuit. The primary clock is configured to generate a primary clock signal. The secondary clock is configured to generate a secondary clock signal. The state determination circuit is associated with the primary clock and the secondary clock and is configured to determine a current operating state associated with at least one of a primary clock condition and a power-on-reset (POR) condition in the IC. The current operating state is one of a second operating state and a first operating state. The control circuit is communicatively associated or coupled with the state determination circuit and is configured to generate a control signal in response to a determination of the first operating state. The control signal is configured to facilitate a transition from the primary clock to the secondary clock upon or subsequent to the determination that the current operating state corresponds to of the first operating state. The secondary clock is associated with a safe operating mode of the IC. The control signal is further configured to facilitate a transition from the safe operating mode to a normal operating mode upon or subsequent to a determination that the current operating state corresponds to the second operating state. The first operating state comprises a low power operating state or an invalid operating state, and the second operating state comprises a power-on operating state or a valid operating state.

In one embodiment, a method of asymmetric ageing prevention in an IC comprises detecting a current operating state associated with at least one of a primary clock condition and a POR condition in the IC. The current operating state is one of a first operating state and an second operating state. The method also includes generating a control signal in response to a determination of the first operating state. The control signal is configured to facilitate a triggering of a safe operating mode of the IC upon or subsequent to the determination that the current operating state corresponds to the first operating state. Also, the method includes transitioning from the safe operating mode to a normal operating mode of the IC based on a determination that the current operating state corresponds to the second operating state. The first operating state comprises a low power operating state or an invalid operating state, and the second operating state comprises a power-on operating state or a valid operating state.

Moreover, in an embodiment, an IC embodying a circuit configured for asymmetric ageing prevention is provided. The IC configured for asymmetric ageing prevention comprises an asymmetric ageing prevention circuit and a clock interface circuit. The asymmetric ageing prevention circuit comprises a primary clock, a secondary clock, a state determination circuit, a control circuit, a reset circuit, and a clock selection circuit. The primary clock is configured to generate a primary clock signal. The secondary clock is configured to generate a secondary clock signal. The state determination circuit is associated with the primary clock and the secondary clock, and is configured to determine a current operating state associated with at least one of a primary clock condition and a power-on-reset (POR) condition in the IC. The current operating state is one of a second operating state and an first operating state. The control circuit is communicatively associated or coupled with the state determination circuit and is configured to generate a control signal in response to a determination that the current operating state corresponds to the first operating state. The control signal is configured to facilitate a transition from the primary clock to the secondary clock upon or subsequent to the determination that the current operating state corresponds to the first operating state. The secondary clock is associated with a safe operating mode of the IC. The control signal is further configured to facilitate a transition from the safe operating mode to a normal operating mode upon or subsequent to a further determination that the current operating state corresponds to the second operating state. The first operating state comprising a low power operating state or an invalid operating state, and the second operating state comprising a power-on operating state or a valid operating state. The reset circuit is coupled with the secondary clock and the control circuit, the reset circuit configured to prevent the POR condition until the determination that the current operating state corresponds to the second operating state. The clock selection circuit is coupled with the primary clock, the secondary clock and the control circuit. The clock selection circuit is configured to select the primary clock signal as an output upon or subsequent to the determination that the current operating state corresponds to the second operating state, and the clock selection circuit is further configured to select the secondary clock signal upon or subsequent to the determination that the current operating state corresponds to the first operating state based on the control signal. The clock interface circuit is communicatively associated or coupled with the asymmetric ageing prevention circuit and is configured to distribute the output of the clock selection circuit and the reset circuit to a plurality of components associated with the IC.

Figure 1:
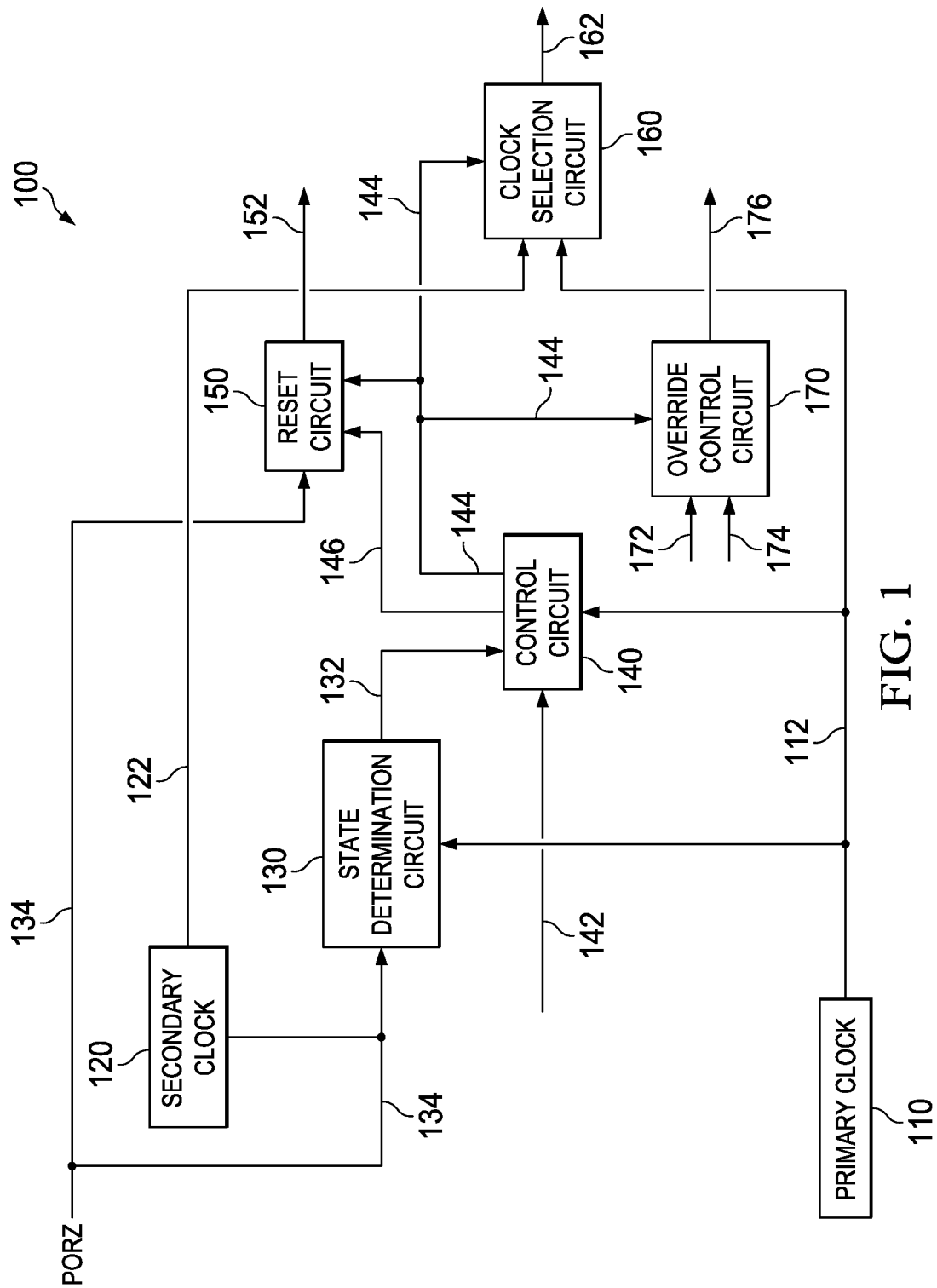
FIG. 1 is a block diagram of circuit for asymmetric ageing prevention, according to an embodiment.

The drawings referred to in this description are not to be understood as being drawn to scale except if specifically noted, and such drawings are only exemplary in nature.

DETAILED DESCRIPTION

In an exemplary scenario, the operation of electronic circuits and/or devices incorporating electronic circuits may be significantly associated with the respective power consumption specifications or profiles of the various circuits and/or devices. As such, the power of such electronic circuits is maintained above a minimum threshold value. When the devices incorporating the electronic circuits are operated at a relatively low power level, a power-on-reset (POR) circuit monitors the electronic circuit so as to ensure that the power is maintained above the minimum threshold value. In an exemplary embodiment, the POR circuit asserts a reset signal when the supply voltage is detected and de-asserts the reset signal when the supply voltage has reached an acceptable level that is sufficient for the device's normal operation. In one exemplary embodiment, the POR circuit can also be used to assert the reset signal when the supply voltage falls below an acceptable level. In an embodiment, when the reset signal is asserted, the reset signal resets the device's internal logic to a preselected state. When de-asserted, the reset signal is used to terminate the reset operation and allow the device to commence normal operation. It is noted that the term "assert", as used herein, may be construed, for example, as being synonymous or similar to the term "transmit". It is further noted that the term "de-assert", as used herein, may be construed, for example, as being synonymous or similar to a ceasing of a transmission.

The SoC devices operate in a variety of modes, for example, a power-on mode, a low power or a power save mode, a normal operating mode, and the like, based on the respective power consumption specifications or profiles of the devices. In the low power operating mode or power save mode of operation, the SoC device may operate by using a clock gating, which is helpful to reduce active power of the electronic circuit to a minimum level. For example, for an electronic circuit operating in a power save mode, a gating signal may be applied to various circuit elements, such as a p-channel metal oxide semiconductor (PMOS). However, when the electronic circuits and/or elements thereof are held or maintained in a static state for relatively long periods of time, they develop a bias towards a propagation of data on, through, along or from specific edges (e.g., NBTI and PBTI). In various embodiments, the phenomenon of developing a bias towards the propagation of the data on, through, along or from specific edges when the ICs are held or maintained in a static state for relatively long periods of time may be referred to as 'asymmetric ageing'.

In an exemplary scenario, when the gate of the PMOS is negatively biased at an elevated temperature for a substantial period of time, the threshold voltage of the device is increased. The increase in the threshold voltage causes reliability performance degradation for the circuit elements, thereby degrading the SoC performance. In some embodiments, the electronic circuits and/or the SoC devices may experience switching failures due to NBTI and PBTI, thereby causing asymmetric ageing in the circuits/devices. For example, during a "switch-on" or activation of a SoC device, a POR circuit of the SoC device may malfunction, thereby leading to a no-reset condition at a finite time or an extended time duration of a reset assertion. In another exemplary scenario, a reset may not occur upon or subsequent to the device being "switched-on" or activated. In yet another exemplary scenario, the device may be detected to be without a reference clock signal upon or subsequent to the occurrence of the "power-on" or activation. In one embodiment, various circuits, such as, for example, double data rate (DDR) circuits, are very sensitive to such effects, and, therefore, a minimum power balance is to be maintained to provide robustness to the circuit.

Various embodiments of the present technology provide solutions that may be implemented to minimize the effects of asymmetric ageing and provide robustness to the electronic circuit. For example, various embodiments provide solutions that may be implemented to minimize the asymmetric ageing effects even when the POR condition and the clock condition (e.g., of the reference clock) of a circuit are unknown. For example, an embodiment provides solutions for asymmetric ageing when the POR is asserted or when the reference clock is absent. Furthermore, various embodiments of the present technology provide circuits, for example, an asymmetric ageing prevention circuit configured to provide an automatic control so as to switch from one mode to another mode in order to prevent various effects of asymmetric ageing. For example, in one embodiment, the asymmetric ageing prevention circuit facilitates a switching to a safe operating mode when a first operating state of the IC is detected. In an embodiment, the first operating state comprises a low power operating state or an invalid operating state. In one embodiment, the asymmetric ageing prevention circuit facilitates a switching from the safe operating mode to a normal operating mode when the first operating state of the circuit is rectified. Various embodiments of the present disclosure are herein disclosed with reference to FIGS. 1-8.

FIG. 1 is a block diagram illustrating a circuit 100 configured for asymmetric ageing prevention according to an embodiment. The circuit 100 is configured to receive a primary clock signal from a reference clock of a device. The reference clock may be referred to as the "primary clock" of the circuit 100, although the terms "primary" and "secondary", and the like, are not to be construed as connoting a specific order of importance or operation. As depicted, the circuit 100 includes a primary clock 110, a secondary clock 120, a state determination circuit 130, a control circuit 140, a reset circuit 150, and a clock selection circuit 160.

The primary clock 110 is configured to generate a primary clock signal 112. In various embodiments, during a normal mode of operation, the primary clock signal 112 may be provided as a reference clock signal to the various components of the circuit; however, during a malfunction (or an invalid state) in the circuit, the secondary clock 120 may be utilized as the reference clock. In an embodiment, when the secondary clock 120 is utilized as the reference clock, the secondary clock signal is provided as the reference clock signal to various circuit elements. In an embodiment, the secondary clock 120 is an internal clock. In an embodiment, the secondary clock 120 is configured to generate a low frequency signal. In an exemplary embodiment, the secondary clock 120 may be generated from a ring oscillator.

In some embodiments, the primary clock 110 includes any device or set of devices configured to enable a generation of the clocked pulses. For instance, the primary clock circuit 110 may be embodied alone or in combination with a number of sequential and/or combinational elements. In various embodiments, the secondary clock 120 includes any device or set of devices configured to enable a generation of the clocked pulses such that the frequency of the secondary clock is lower than the frequency of the primary clock. For instance, the secondary clock 120 may be embodied alone or in combination with a number of sequential and/or combinational elements.

In various embodiments, the asymmetric aging phenomenon may be caused when the primary clock 110 is detected to be absent (which may be referred to as a 'clock absent condition'), and/or during extended periods of reset assertion (which may be referred to as a 'reset condition') in the circuit. In an embodiment, either of the clock absent or reset conditions can lead to the first state of the circuit.

In various embodiments, the state determination circuit 130 is configured to determine that a current operating state of the circuit is one of a first operating state and a second operating state. In an embodiment, the first operating state may be associated with the In an embodiment, the term 'current operating state' of the circuit is associated with a primary clock condition and a POR condition in the circuit. When the primary clock is determined to be absent, the circuit may be referred to as operating in a low power state. Moreover, when the POR is determined to be present for an extended duration in the circuit, the state of the circuit may be referred to as an invalid operating state. For example, upon or subsequent to a switching, the state determination circuit 130 may determine or identify the clock absent condition in the circuit. In an embodiment, the state determination circuit 130 may determine or identify the clock absent condition based on the primary clock signal 112 generated from the primary clock 110. In an embodiment, based on the determination of the clock absent condition, the state determination circuit 130 is configured to output a signal, for example, a signal 132 that is indicative of the absence of the primary clock signal 112 in the circuit.

In some embodiments, the state determination circuit 130 is configured to detect the first state associated with the POR condition. In various embodiments, the state determination circuit 130 is configured to determine that the current operating state corresponds to the invalid operating state associated with the POR condition based on a power-on-reset (PORZ) signal 134. In an embodiment, upon or subsequent to determining or identifying the current operating state corresponding to the invalid operating state associated with the POR condition, the state determination circuit 130 generates a signal, for example, the signal 132. In some embodiments, the state determination circuit 130 is configured to determine the invalid operating state of the circuit based on a self-generated POR signal. The self-generated PORZ signal is configured to provide a self-generated reset to the circuit. It is noted that the state determination circuit 130 may generate a single signal or a plurality of signals indicating the invalid operating state of the circuit. For example, with reference to FIG. 1, the state determination circuit 130 is configured to generate a single signal that is indicative of the clock condition and the POR condition. However, in various other embodiments, the state determination circuit 130 may output distinct signals indicating the clock condition and the POR condition, respectively, in the circuit.

The state determination circuit 130 is coupled with or connected to the control circuit 140. The control circuit 140 is configured to receive one or more signals associated with the current operating state of the circuit. In various embodiments, the control circuit 140 is configured to receive one or more input signals associated with the clock absent condition and the POR condition. In an exemplary embodiment, the control circuit 140 may receive a safe override signal (e.g., safe override signal 142). In an embodiment, the safe override signal 142 may allow the circuit 100 to bypass the state determination circuit 130 in certain circumstances. For example, during various debugging processes, the state determination circuit 130 may be bypassed by providing the safe override signal 142 as an input to the control circuit 140.

In an embodiment, the invalid operating state of the circuit pertains to an unknown state and is to be avoided such that proper functioning of the circuit may be achieved. In the invalid state, the primary clock 110 may malfunction, and the utilization of the primary clock 110 to provide the reference clock to the circuit is to be avoided. In an embodiment, the control circuit 140 is configured to generate a control signal, for example, the control signal 144, based on the determination of the invalid operating state of the circuit. In various embodiments, the control signal 144 is configured to facilitate the transition from the primary clock 110 to the secondary clock 120, thereby causing the circuit to be in a specific preselected state. In various embodiments, the secondary clock 120 is associated with a safe operating mode. In one embodiment, the control circuit 130 includes an 8-bit counter.

In an embodiment, the control circuit 140 is coupled with or connected to the clock selection circuit 160, which is configured to receive the primary clock signal 112 and the secondary clock signal 122 and output one of the primary clock signal 112 and the secondary clock signal 122 based on a selection performed by the control signal 144. In an embodiment, when the control signal 144 that is input into the clock selection circuit 160 is asserted, the secondary clock signal 122 is selected as an output 162 from the clock selection circuit 160. In various embodiments, the secondary clock 120 is associated with a safe operating mode, and, accordingly, when the secondary clock signal 122 is selected as output 162 of the clock selection circuit 160, the secondary clock signal 122 is provided as the reference clock input to the circuit.

In one embodiment, when the control signal input 144 that is input into the clock selection circuit 160 is de-asserted, the primary clock signal 112 is selected as an output signal 162 from the clock selection circuit 160. In various embodiments, the output signal 162 of the clock selection circuit 140 may be provided as a reference clock input to the circuit/SoC device incorporating the circuit.

In various embodiments, the control circuit 140 is coupled with or connected to the reset circuit 150. In an embodiment, the reset circuit 150 is configured to generate a reset signal 152 that is asserted such that a reset (or power-on-reset) may be performed during the normal operating mode of the circuit. In an embodiment, the reset circuit 150 is configured to prevent the POR by de-asserting the reset signal 152 for the first predetermined time period. In an embodiment, the reset is assumed to be 'active low'; it is noted, however, that the reset may be 'active high' in various applications.

In various embodiments, when the first operating state of the circuit is determined, the control signal 144 is input into the reset circuit 150, which may, in turn, prevent the generation of the reset signal 152 in the circuit. In an embodiment, the reset circuit 150 is configured to prevent the POR condition until the second current operating state is determined. In various embodiments, the reset circuit 150 is configured to prevent the POR for a first predetermined time period following the determination of the second operating state. For example, following the transition of the primary clock 110 to the secondary clock 120, the reset circuit 150 may prevent the reset in the circuit for about 94 clock cycles.

In various embodiments, due to the prevention of the reset in the circuit for the first predetermined time period, the transition from the safe operating state to the normal operating state is performed in a glitch-free manner. In various embodiments, the glitch-free transition is performed by preventing the reset for a predetermined time period after the transition, and, thereafter, generating a wake-up signal to allow the reset in the circuit. In an embodiment, the wake-up signal, for example, a wake-up signal 146 is generated by the control circuit 140. In some embodiments, the wake-up signal 146 may be generated by the control circuit 140 upon or subsequent to an elapse of a second predetermined time period from the determination of the second operating state. In an exemplary embodiment, the wake-up signal 146 may be generated upon or subsequent to an elapse of 126 clock cycles after the determination of the second operating state (or after the generation of the safe signal). The waveforms representing the wake-up signal, safe signal, first predetermined time period, second predetermined time period, and the like, are illustrated and explained herein with respect to FIG. 3.

In an embodiment, the control circuit 140 is coupled with or connected to an override control circuit 170. The override control circuit 170 is configured to drive a critical state of circuit 100 other than the clock and the reset when the first state of the circuit is detected. In particular, the override control circuit 170 is configured to receive a current signal 172 (which may be indicative of a current clock value), an override signal 174 (which may be indicative of the override clock value), and the control signal 144; the override control circuit 170 is also configured to output one of the current signal 172 and the override signal 174 based on a selection being performed by the control signal 144. In various embodiments, the current signal 172 is the value of the clock signal that may be driven during the normal current operating state, and the override signal 174 is the value of the signal that is associated with a SoC control that is second upon or subsequent to a detection of the invalid operating state. It is noted that the term "drive", as used herein, may be construed, for example, as being synonymous or similar to the term "enable".

In various embodiments, the control signal 144 is asserted upon or subsequent to a determination of the current operating state as the first operating state, and, in response, resets the value of the output clock signal to the override signal 174. In this embodiment, an output signal 176 of the override control circuit 170 is fed to the SoC device. In various embodiments, in so much as the override control circuit 170 drives the reset value of the clock signal to the override clock value (which is indicative of an asymmetric ageing value), the circuit 100 is continuously toggled, even in the unknown reset and/or clock conditions. In an embodiment, the override signal 174 is configured to prevent a change of state of a plurality of peripheral circuits associated with the IC during the low power operating state.

Figure 2:
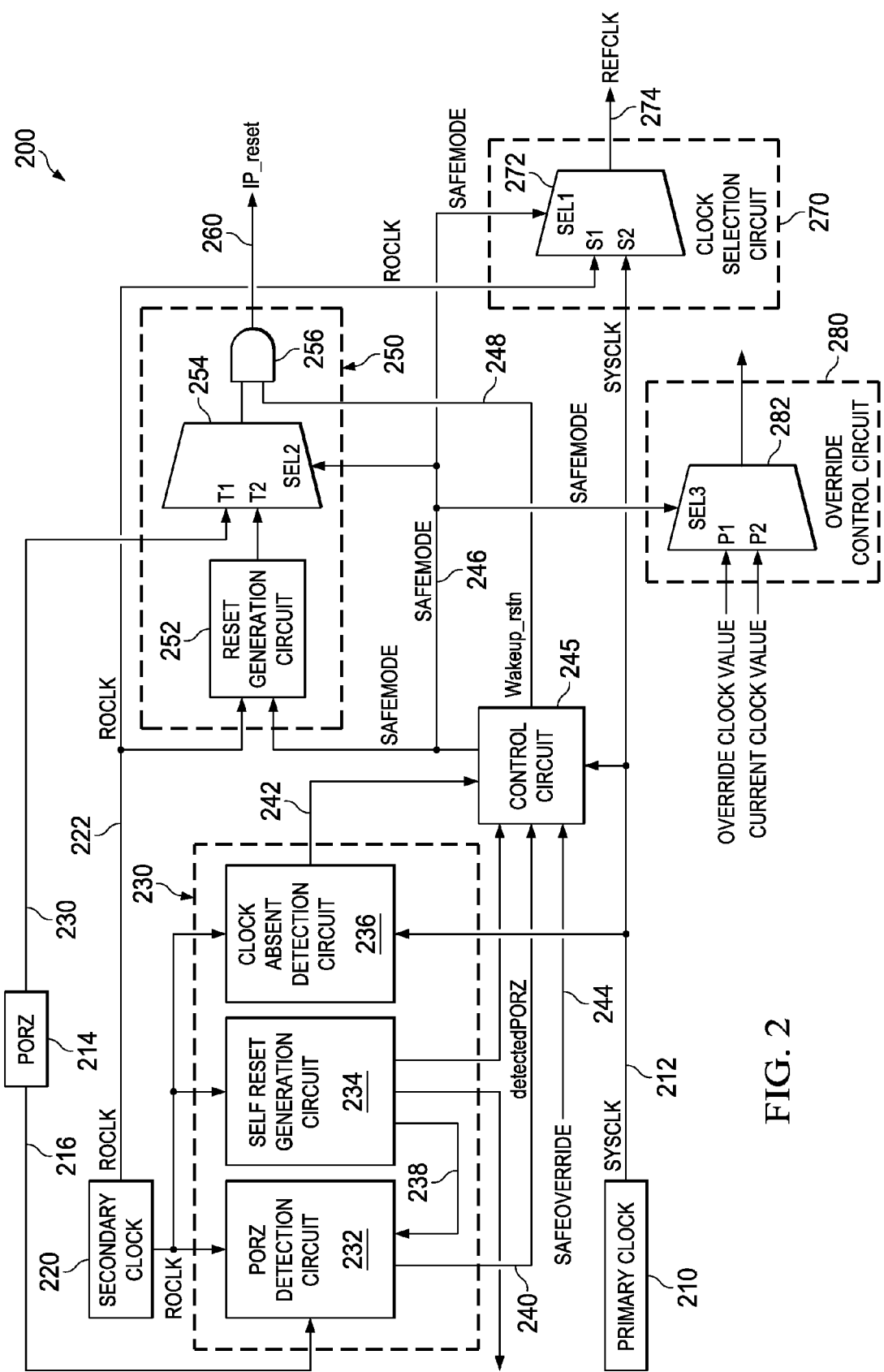
FIG. 2 is a block diagram of a circuit for asymmetric ageing prevention in an integrated circuit (IC), according to another embodiment.

FIG. 2 is a block diagram illustrating a circuit 200 configured for asymmetric ageing prevention in an IC according to an embodiment. As depicted, the circuit 200 is logically divided into six parts: a primary clock 210, a secondary clock 220, a state determination circuit 230, a control circuit 245, a reset circuit 250, a clock selection circuit 270, and an override control circuit 280. In an exemplary scenario, asymmetric ageing prevention may be explained with reference to the exemplary embodiment of the asymmetric ageing prevention circuit 200 shown in FIG. 2. Moreover, pursuant to one exemplary scenario, asymmetric ageing may be prevented by a detection of the first operating state of the IC. In various embodiments, the first operating state to of the IC may refer to a low power operating state or an invalid operating state, for example, a reference clock missing condition and/or an extended duration of a reset (or the POR condition).

The primary clock circuit 210 is configured to generate a primary clock signal, which may be referred to as a sysclk signal 212. In various embodiments, the sysclk signal 212 is the reference signal for various system components of the IC. In various embodiments, the secondary clock 220 is configured to generate a secondary clock signal, such as a roclk signal 222. In an embodiment, the secondary clock signal 222 is an internal signal generated from a ring oscillator. In an embodiment, the ring oscillator may be utilized for generation of the low frequency clock by implementing a frequency divider circuit. For example, a divide by 16 frequency divider circuit may be coupled with the secondary clock for generating a low frequency clock signal output (secondary clock signal 222).

In various embodiments, during the first operating state associated with the primary clock 210 (for example, when the primary clock is determined to be absent), the secondary clock signal (e.g., roclk signal 222) is provided as the reference clock signal to various components of the IC. In an embodiment, after a Power-ON, the secondary clock is actuated such that at every rising edge of the secondary clock signal 222, a value of PORZ is determined, by generating an internal reset signal (as explained below). In an embodiment, an internal reset signal, for example, a selfgen PORZ signal may be utilized for initializing operation of a state determination circuit, for example, the state determination circuit 230 that is configured to determine an invalid state of the circuit.

In various embodiments, the primary clock 210 and the secondary clock 220 are coupled with or connected to the state determination circuit 230. The state determination circuit 230, which is similar to the state determination circuit 130, is configured to detect a current operating state of the IC as being one of a first state and a second state. In an embodiment, the first invalid state of the IC is associated with a low power operating state or an invalid operating state one of a clock absent condition and a POR condition. In an embodiment, the current state of the circuit may be determined based on the determination of the presence/absence of a second primary clock signal and/or a POR condition. In an embodiment, the state determination circuit 230 comprises a PORZ detection circuit 232, a self-reset generation circuit 234 and a clock absent detection circuit 236. In an embodiment, the self-reset generation circuit 234 is configured to detect the current operating state of the IC by generating a self-gen PORZ signal, such as a signal 238.

In an embodiment, the self-reset generation circuit 234 may include a counter, for example a 32-bit counter that is configured to determine a value indicative of generation of the self-gen PORZ signal 238. For example, for a 32-bit counter, a total of $2^{32}$ combinations of values may be possible, out of which one or more values may be determined as the values corresponding to the generation of the self-gen PORZ signal 238. In an embodiment, the one or more values may be represented as MAX_RO_CLK, and may assume predetermined values. In an embodiment, the secondary clock 220 may be clocked at different instants such that the predetermined values may have equal number of 0s and 1s. In an embodiment, the predetermined values may not assume the values having all 0s or all 1s or 0X5555 or 0XAAAA. When the value of the selfporz_osc_cnt is determined to be equal to the MAX_RO_CLK, then the self-reset generation circuit 234 generates the self-gen PORZ signal 238. In an example embodiment, the detection of POR condition based on the self-gen PORZ 238 signal may be represented as follows:
At the positive edge (or rising edge) of the secondary clock (roClk),

```
if (selfporz_osc_cnt==MAX_RO_CLK)
    selfgenPorz = 1,selfporz_osc_cnt=selfporz_osc_cnt
else selfgenPorz=0, selfporz_osc_cnt++.
```

Various timing diagrams illustrating signals at various nodes of the state determination circuit 230 are explained and illustrated with reference to FIGS. 4A and 4B.

The self-gen PORZ signal 238 generated by the self-reset generation circuit 234 facilitates in determination of the POR condition. In an embodiment, the self-reset generation circuit 234 is coupled with the PORZ detection circuit (or counter) 232. The PORZ detection circuit 232 is also be coupled with an external power-on-reset generation (PORZ) circuit 214. In an embodiment, the PORZ detection circuit 232 is configured to receive the self-gen PORZ signal 238 generated by the self-reset generation circuit 232 and a POR signal 216 received from the PORZ circuit 232. The PORZ detection circuit 232 is configured to detect the state of power-on-reset generated by the PORZ circuit 214 at every edge of the secondary clock signal 222. In an embodiment, upon detection of the POR condition, the PORZ detection counter 232 is configured to generate a detected PORZ signal 240 indicative of detection of the POR condition. In an embodiment, the detected PORZ signal 240 assumes a '0' value when PORZ is deasserted. A process flow diagram representing the state of power-on-reset (PORZ) for various values of self-gen PORZ signal 238 is illustrated and explained with reference to FIG. 4C.

In an embodiment, the detected PORZ signal 240 drives the detection of the clock absent condition. In an embodiment, upon generation of the detected PORZ signal 240, the clock absent detection circuit 236 is configured to generate a signal that is indicative of an absent system clock (for example, a sysClkAbsent signal 242) for detecting the clock absent condition of the IC.

In an embodiment, the inputs to the clock absent detection circuit 236 are secondary clock signal 222 and the primary clock signal 212, and the output may be sysClkAbsent signal 242 (upon detection of the clock absent condition). In an embodiment, the detection of the clock absent condition in the IC may be performed by implementing two counters for evaluating the primary clock signal value and the secondary clock signal value at the edges of primary clock signal 212. In an embodiment, a first counter, for example counter 1 may determine a scenario when the primary clock (sysclk) signal is absent, and is in '0' state. In an embodiment, a second counter, for example counter 2 may determine a scenario when the primary clock (sysclk) signal 212 is present, and is in '1' state. In an embodiment, the width of the counter, n, may assume a value of greater than or equal to 3. In an embodiment, the test mode may be implemented for bypassing the functional logic to enable a test in a tester. A logic for determination of the clock absent condition by utilizing counter 1 and counter 2 may be as follows:

```
(evaluate at roClk or sysClk)    // roClk and sysClk refers to secondary
                                 // clock signal and primary clock
                                 signal, respectively
N = 2^n
Counter1:
    If (!(sysClk | testMode)) count1=0,
        Elseif (count1 == N) count1=count1;
        Else count1++;
Counter2:
    If (sysClk & !testMode) count2=0,
        Elseif (count2 == N) count2=count2;
        Else count2++;
sysClkAbsent = count1[MSB] | count2[MSB]
```

In various other embodiments, the current operating state of the IC may be determined based on a safe override signal (for example, a safeOverride signal 244). In an embodiment, the safe override signal may enable the circuit to bypass the state determination circuit 230; it is noted, for example, that this may always occur or that it may occur in response to an input.

As discussed, in response to the determination of the invalid state of the IC by the state determination circuit 230, the control circuit 244 is configured to receive one or more inputs from the state determination circuit 230. For example, based on the input signals, such as the signals: detectPorz, sysClkAbsent, sysClk, selfgenPorz, safeOverride, the control circuit 245 may determine that the current operating state of the circuit corresponds to the first operating state/the second operating state, and, in response, generate a control signal when the current operating state is determined to be the first state. In an exemplary embodiment, an algorithmic representation of the input to the control circuit 245 may be presented as:
Input: detectPorz, sysClkAbsent, sysClk, selfgenPorz, safeOverride In an exemplary embodiment, in response to the determination of the current operating state of the IC as the first operating state, the control circuit 245 is configured to generate a control signal, such as, for example, a safemode signal 246, that may be implemented to enable a transitioning of the reference clock signal from the primary clock 210 to the secondary clock 220.

In various embodiments, the clock selection circuit 270 is coupled with or connected to the control circuit 245 and is configured to receive the primary clock signal 212 and the secondary clock signal 222 and output one of the primary clock signal 212 and the secondary clock signal 222 based on a selection being performed by the control signal, for example, the safemode signal 246.

In an exemplary embodiment, the clock selection circuit 270 includes a multiplexer circuit for example, the multiplexer circuit 272, which has input ports s1 and s2. The input ports s1 and s2 are configured to receive input signals, for example, the primary clock signal 212 and the secondary clock signal 222 from the primary clock 210 and the secondary clock 220. In an embodiment, the input port s1 is configured to receive the secondary clock signal 222 from the secondary clock 220, while the input port s2 is configured to receive the primary clock signal 212 from the primary clock 210. The clock selection circuit 260 selects one of the inputs from input ports s1 and s2 as an output (which may be represented as signal 274) based on a selection signal received at a selection port sel1. In various embodiments, when the invalid state of the circuit is detected, the selection signal received at the selection port sel1 includes the control signal (for example, the safemode signal 242) output from the control circuit 245. When the safemode signal 246 is asserted at the selection port sel1 of the multiplexer circuit 272, the input port s1 is selected, and the secondary clock signal, roclk signal 222 is output from the clock selection circuit 270 and provided as a reference clock (signal 274) input into various components of the circuit. In various embodiments, in the absence of the selection signal at the selection port sel1, the primary clock signal (e.g., sysclk signal 212) is selected and output from the multiplexer circuit 272.

In an embodiment, the control circuit 245 is further configured to prevent a reset in the IC upon or subsequent to a power-on or activation until the state of the IC is determined to be a second current operating state. In an embodiment, the control circuit 245 is further configured to prevent the POR for a first predetermined time period following the determination of the second current operating state. In an exemplary embodiment, the control circuit 240 is configured to provide the safemode signal 246 to the reset circuit 250 such that safemode signal 246 prevents any POR in the IC for the first predetermined time period. In various embodiments, the safemode signal is indicative of the operation of the IC in the safe mode.

In an exemplary embodiment, the reset circuit 250 includes a reset generation circuit 252, a multiplexer 254 and an AND gate 256. The reset generation circuit 252 receives the secondary clock signal 222 as an input. Also, the reset generation circuit 252 is configured to receive the safemode signal 246 from the control circuit 245 when the first current operating state of the circuit is detected, and, in response, output a safety_rstn signal 258.

The multiplexer 254 is coupled with or connected to the reset generation circuit 252 and is configured to receive inputs at input ports t1 and t2. In various embodiments, the multiplexer 254 is configured to select one of the inputs received at the input ports t1 and t2 based on a selection signal being asserted or de-asserted at a selection port sel2. In various embodiments, the multiplexer 254 is configured to receive the safety_rstn signal 258 and the PORZ signals as inputs at the input ports t1 and t2 and the control signal (for example, the safemode signal 246) at the selection port sel2.

In an embodiment, upon or subsequent to a determination of the current operating state as the first current operating state, the multiplexer circuit 254 is configured to receive the safemode signal 246 from the control circuit 245, and, in response, output the safety_rstn signal 258 as an output of the multiplexer circuit 254. The output of the multiplexer circuit 254 is provided as one of the inputs to the AND gate 256. The AND gate 256 is configured to perform a logical "ANDing" of the safety_rstn signal 258 and a wakeup_rstn signal 248 received from the control circuit 246, and output a signal, for example, an IP_reset signal 260. In various embodiments, the wakeup_rstn signal 248 is generated upon or subsequent to an elapse of a second predetermined time period from the triggering of the safe operating mode (or from the generation of the safemode signal 246). The wakeup_rstn signal 248 is configured to facilitate the transition from the safe operating state to the normal operating state in a glitch-free manner. In an embodiment, the generation of the wakeup_rstn signal 248 after the elapse of the second predetermined time period from the generation of the safemode signal 246 ensures that the first operating state has ceased to exist. In an exemplary embodiment, the second predetermined time period may include a predetermined number of clock cycles associated with the primary clock 210, for example 32 primary clock cycles.

In one embodiment, when the select line sel1 of the multiplexer circuit 254 is asserted by the safemode signal 246, the input s1 is selected and the safety_rstn signal 258 is output from the multiplexer 254. In one or more other embodiments, when the first operating state ceases to exist, the input t1 of the multiplexer circuit 254 is selected, the PORZ signal is output from the multiplexer circuit 254, and the POR condition of the IC is enabled.

Pursuant to one exemplary implementation, the reset generation may be de-asserted as soon as possible, thereby keeping or maintaining the asymmetric ageing circuit, for example, the circuit 200, in a toggling state. In an example, the lock duration is less than 1 M cycles, and a 27-bit chain divider may be utilized to achieve this lock duration. For a given case of a 27-bit counter, a default value of X+Y is 134217727, and a default value of X is 7727. Moreover, the safety reset is asserted at the positive edge of the primary clock signal.

In an exemplary embodiment, the logic for a safety reset performed by the safety reset generation circuit, for example, the reset circuit 252, may be presented as:

```
osc_cnt++;
if(osc_cnt == X) safety_rstn <= 1b1;
else if(osc_cnt == X+Y) safety_rstn <= 1b0
``` where, osc_cnt is the oscillator count, which is indicative of the number of secondary clock cycles.

In various embodiments, the override control circuit 280 is configured to drive a feature of the IC (other than the clock and the reset) when the first state of the circuit is detected. In an exemplary embodiment, the override control circuit 280 may include multiplexer circuit 282, which has input ports p1 and p2. The input ports p1 and p2 are configured to receive input signals, such as, for example, an override clock value and a current clock value. In various embodiments, the override control circuit 280 selects one of the inputs from the input ports p1 and p2 as an output based on a selection signal received at a selection port sel3. For example, the input port p1 may receive a number of preselected static override clock values that may be driven during the fail safe operating mode. In an embodiment, the static override clock values may be hexadecimal values so that the width of the static override clock value and that of the overridecntrl may match. In an embodiment, the width may be indicative of the number of multiplexers and may be configurable based on a number of selected design specifications.

In various embodiments, the selection of one of the inputs p1 and p2 is determined based on a selection signal being asserted at a selection port sel3 of the multiplexer 282. In an embodiment, the selection signal comprises the control signal, for example, the safemode signal 246. In an embodiment, when the first state of the circuit is determined, the selection signal for example, the safemode signal 246, is asserted at the selection port sel3.

In an embodiment, in response to the safemode signal 246 being asserted at the selection port sel3 of the multiplexer circuit 282, the input port s1 is selected, and the static override clock value is output from the output port of the multiplexer circuit 282. In an embodiment, when the safemode signal 246 is de-asserted at the selection port sel3, the current clock value associated with the IC control is output from the output port of the multiplexer circuit 282. In an embodiment, the output of the override control circuit 282 may comprise a width based on the number of override multiplexers. In an embodiment, the output of the override control circuit may be represented as:

Output: overrideCntrl[width-1:0]

In an exemplary embodiment, the algorithmic representation of the override control circuit 280 may be as follows:
overrideCntrl=(safeMode) ? override_clock_value: current_clock_value Accordingly, various embodiments of the present disclosure provide circuits that can be used for asymmetric ageing prevention in various designs irrespective of the clock frequencies utilized in the design application. The disclosed circuits may also be utilized to provide a glitch-free transition of critical circuits in the IC from one clock, such as, for example, the primary clock, to another clock, for example, the secondary clock. Various exemplary scenarios of the POR condition and the clock absent condition being detected by the circuits, for example, the circuit 100 and the circuit 200 are illustrated in FIGS. 3A to 3E. An exemplary operation of the circuit for the prevention of asymmetric ageing, for example, the circuit 100 and the circuit 200, is represented by the timing diagram of FIG. 3F.

In an embodiment, an exemplary algorithm for the circuit of FIGS. 1 and 2 may be presented as follows:

```
Input: detectPorz, sysClkAbsent, sysClk, selfgenPorz
(generated by NCNR logic), safeOverride
Output: wakeup_rstn (active low), safeMode (active high)
Logic: (evaluate at detectPorz, sysClkAbsent, sysClk, selfgenPorz event)
If (!selfgenPorz or detectPorz or sysClkAbsent) safe=1, count=0;
wakeup_rstn_wire=1
Else if (count == N) assert wakeup_rstn_wire to 0; count++;
Else if (count == N+2) assert safe=0; count++;
Else if (count == N+M) deassert wakeup_rstn_wire to 1; count++
Else if (count == MAX) count=count;
Else count++
safeMode = safe & !safeOverride
wakeup_rstn = wakeup_rstn_wire | safeOverride
``` where 'N' represents the number of second sysClk pulses (or clock cycles) to be detected and 'M' represents the width of wakeup_rstn in the number of sysClk cycles (e.g., M>=32).

Figure 3A:
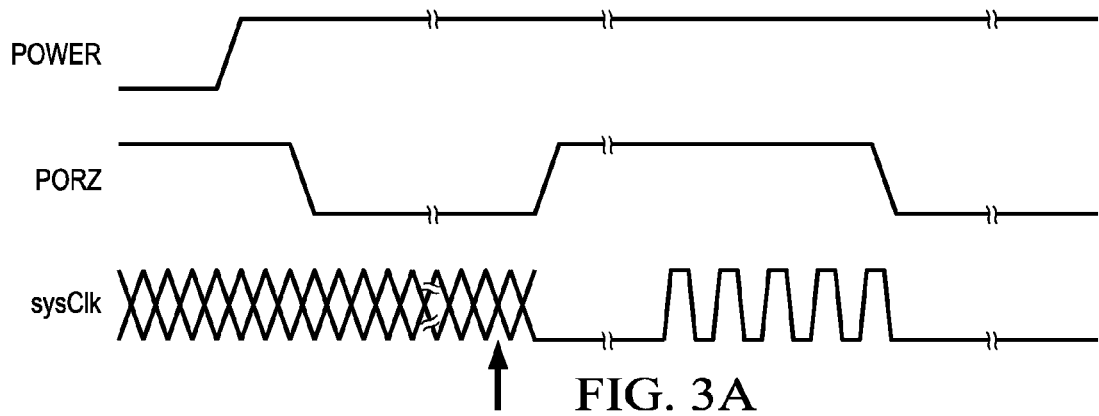
FIG. 3A to 3E are timing diagrams depicting scenarios of POR condition and clock absent condition being detected by a circuit for asymmetric ageing prevention, according to an embodiment.
Figure 3B:
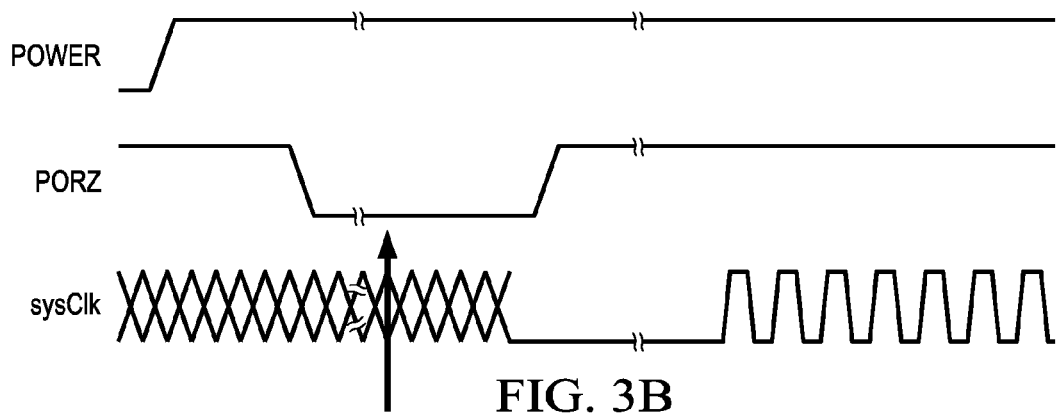
Figure 3C:
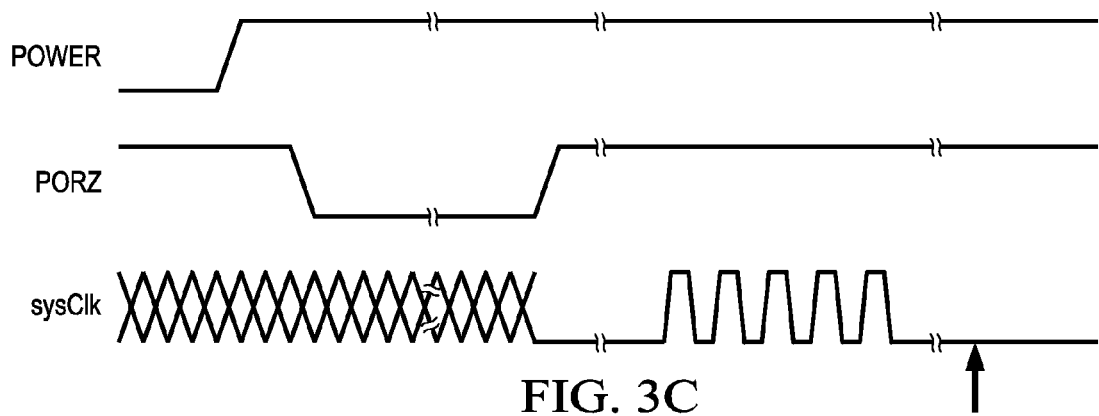
Figure 3D:
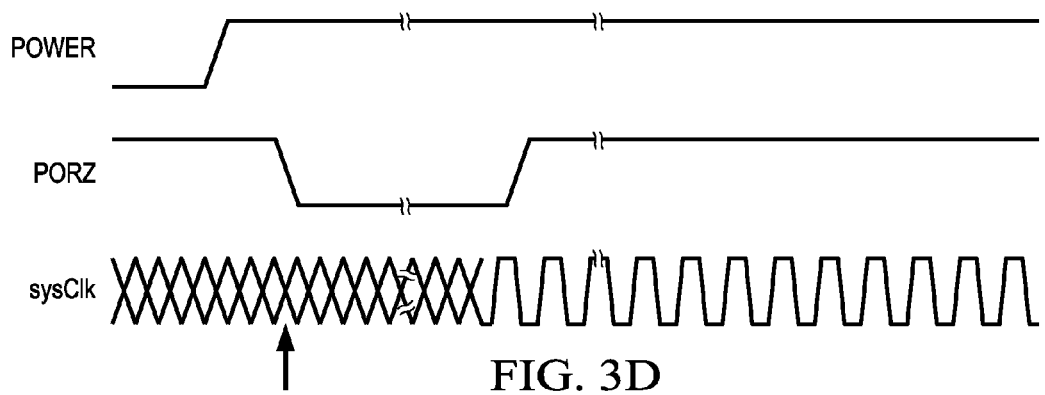
Figure 3E:
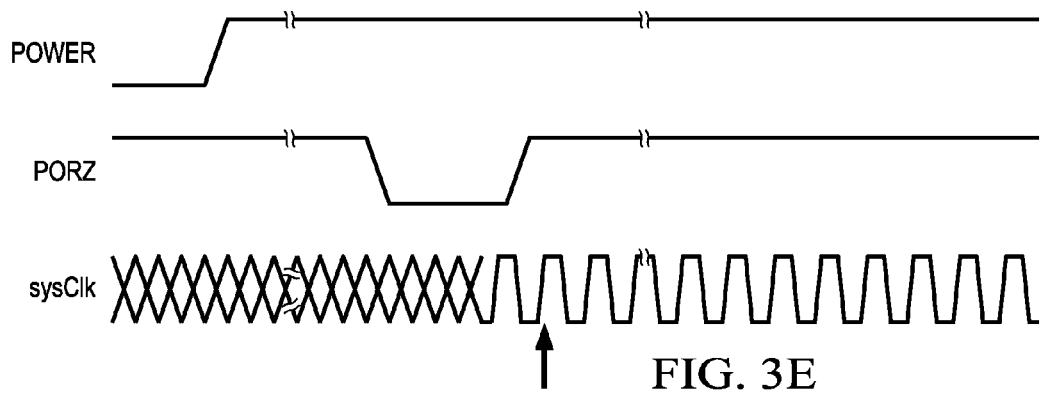

FIGS. 3A to 3E illustrate various timing diagrams depicting scenarios of POR condition and clock absent condition being detected by a circuit, for example, anti-asymmetric ageing detection circuits 100, 200 (explained with reference to FIGS. 1 and 2), in accordance with an example embodiment. As discussed with reference to FIGS. 1 and 2, the circuits 100, 200 are configured to detect whether a second reset has been asserted or not, and whether a system clock absent/present in the IC. As illustrated in FIG. 3A, a scenario of an indefinite unknown system clock is depicted. In the present scenario, an 'indefinite unknown system clock' may refer to a condition wherein for a long duration the system clock (or the primary clock) is absent/unavailable. Also, referring to FIG. 3B, a scenario depicting an indefinite unknown PORZ is illustrated. FIG. 3C illustrates a scenario depicting a long duration stalled clock with PORZ (PORZ=0). In FIG. 3D, a long power-up scenario with PORZ (PORZ=0) is illustrated. In FIG. 3E, a scenario indicating a second clock upon PORZ deassertion is depicted.

In an embodiment, the circuits such as the circuits 100, 200 are configured to detect the conditions mentioned with reference to FIGS. 3A through 3E, since upon power-on of an IC, a state of power-on-reset (PORZ) is determined by the circuit (the circuit 100, 200) followed by the determination of the clock absent condition. Various exemplary timing diagrams illustrating signals at various nodes of the circuit for asymmetric ageing prevention, for example, the circuit 100 and the circuit 200, is represented by the timing diagrams of FIGS. 4A to 4C.

Figure 4A:
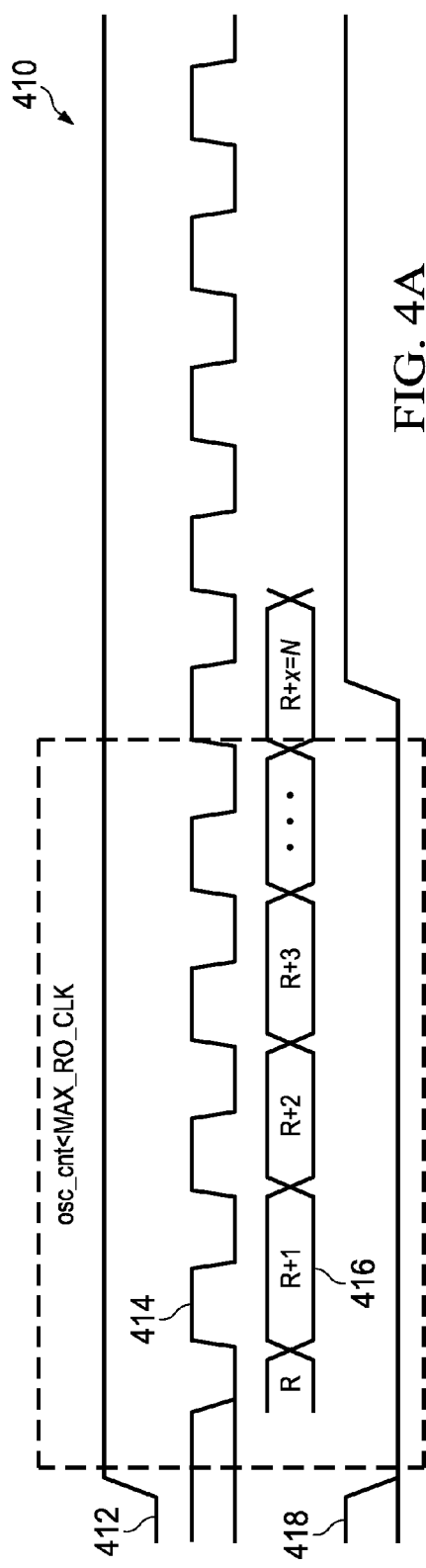
FIGS. 4A and 4B illustrate various timing diagrams illustrating signals at various nodes of the circuit for asymmetric ageing prevention, according to an embodiment.
Figure 4B:
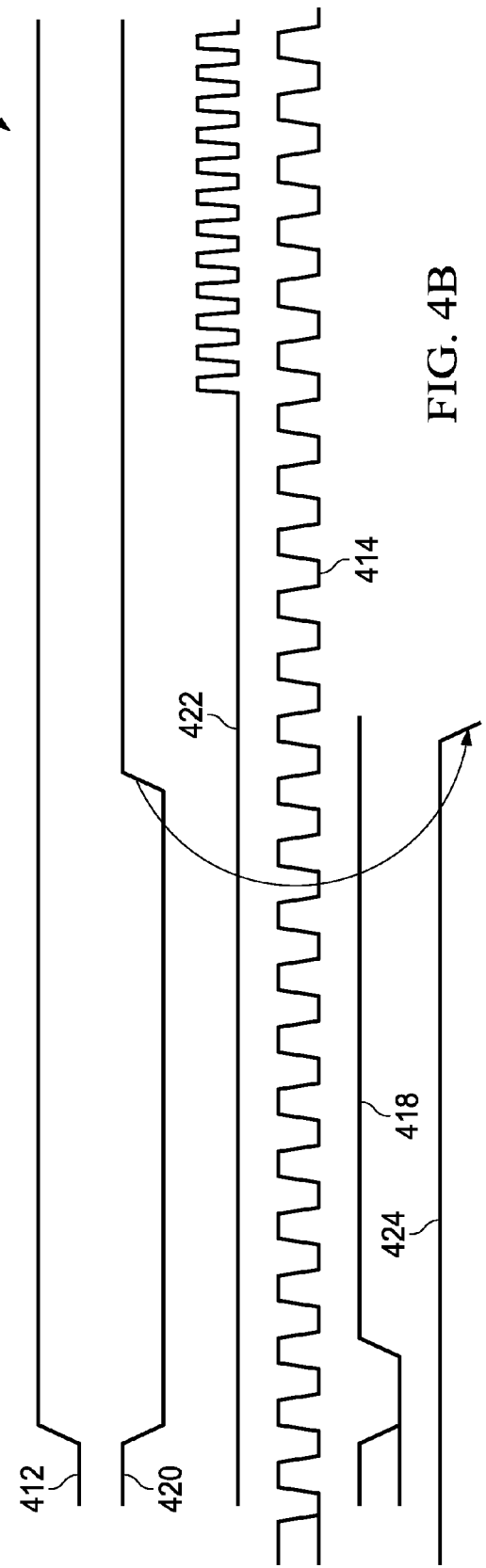

FIGS. 4A and 4B illustrate various timing diagrams illustrating signals at various nodes of the circuit for asymmetric ageing prevention, according to an embodiment. Various indicative transitions of signals at various nodes of the asymmetric ageing prevention circuit are represented at various clock instances. For example, FIG. 4A illustrates generation of the self-gen PORZ signal (see, FIG. 2), for example the self-gen PORZ signal 238 by self-reset generation circuit 234 (see, FIG. 2). The timing diagram 410 represents the signals, such as a power signal 412, a secondary clock signal (roclk) 414, a selfporz_osc_cnt 416, a self-genPorz signal 418. As discussed with reference to FIG. 2 and illustrated in FIG. 4A, the secondary clock (for example, the secondary clock 220) may be clocked at different instants such that the predetermined values may have equal number of 0s and 1s. When the value of the selfporz_osc_cnt 416 is determined to be equal to the MAX_RO_CLK, then the self-reset generation circuit (for example, self-reset generation circuit 234 of FIG. 2) generates the self-gen PORZ signal 418. A logic for generation of the self-gen PORZ signal 418 is discussed with reference to FIG. 2.

Referring to FIG. 4B, a timing diagram 430 for depicting signals at various nodes of the asymmetric ageing prevention circuit (for example, the circuits 100, 200) is explained. The timing diagram 430 represents the signals, such as a power signal 412, PORZ signal 420, a secondary clock signal (roclk) 414, a primary clock signal (sysclk) 422, a self-genPorz signal 418, and a detectedPORZ signal 424. As illustrated with reference to FIG. 4B and explained with reference to FIG. 2, the state of power-on-reset may be generated at every edge of the secondary clock signal 414. In an embodiment, upon detection of the POR condition, a PORZ detection circuit (for example, the PORZ detection counter 232 of FIG. 2) is configured to generate the detected PORZ signal 424 that is indicative of detection of the POR condition. In an embodiment, the detected PORZ signal 424 assumes a '0' value when PORZ is deasserted. A process flow diagram illustrating the state of the detected PORZ signal 424 for detection of the POR condition is explained with reference to FIG. 5.

Figure 5:
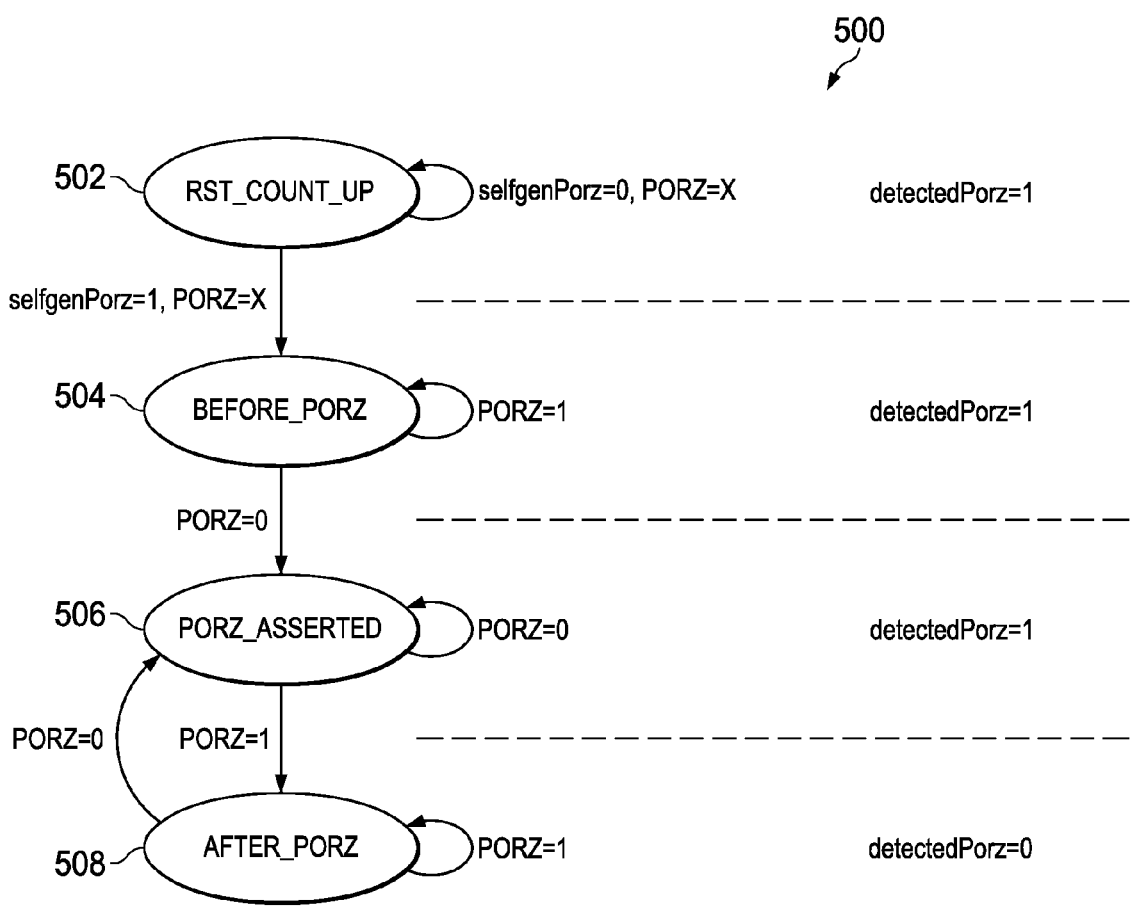
FIG. 5 illustrate a process flow diagram for detection of a POR condition by a asymmetric ageing prevention circuit, in accordance with an embodiment

FIG. 5 illustrates a process flow diagram for detection of a POR condition by the asymmetric ageing prevention circuit, in accordance with an embodiment. In an embodiment, after a Power-ON, the secondary clock is actuated such that at every rising edge of the secondary clock signal 222, a value of PORZ is determined, by generating an internal reset signal, for example, a selfgen PORZ signal. In an embodiment, at every edge of the secondary clock signal, a state of PORZ signal may be determined, and upon detection of a deasserted PORZ, a detectedPORZ signal may be generated. In an embodiment, for determination of the state of the PORZ signal, a state of a self-gen PORZ signal (for example, the self-gen PORZ signal 238 of FIG. 2) is generated.

In an embodiment, the state of the PORZ signal may be 0 or 1. At operation 502, the state of the PORZ may be unknown (PORZ=X). The state of the detectedPORZ is '1' until the state of the PORZ signal changes state from 0 to 1. The operation 502 may be representative of counting performed by the self-reset generation counter (as explained with reference to FIG. 2). At operation 504, the state of PORZ is '1' until the state of PORZ changes from '1' to '0'. Also, the state of the detectedPORZ is '1'. At operation 506, when PORZ signal is asserted, PORZ=0. At operation 508, upon the state of PORZ changes to '1', and the state of the detectedPORZ signal changes to '0'. In certain embodiments, after some time the state of PORZ may again change to '1', for example operation 508 is followed by operation 506.

Figure 6:
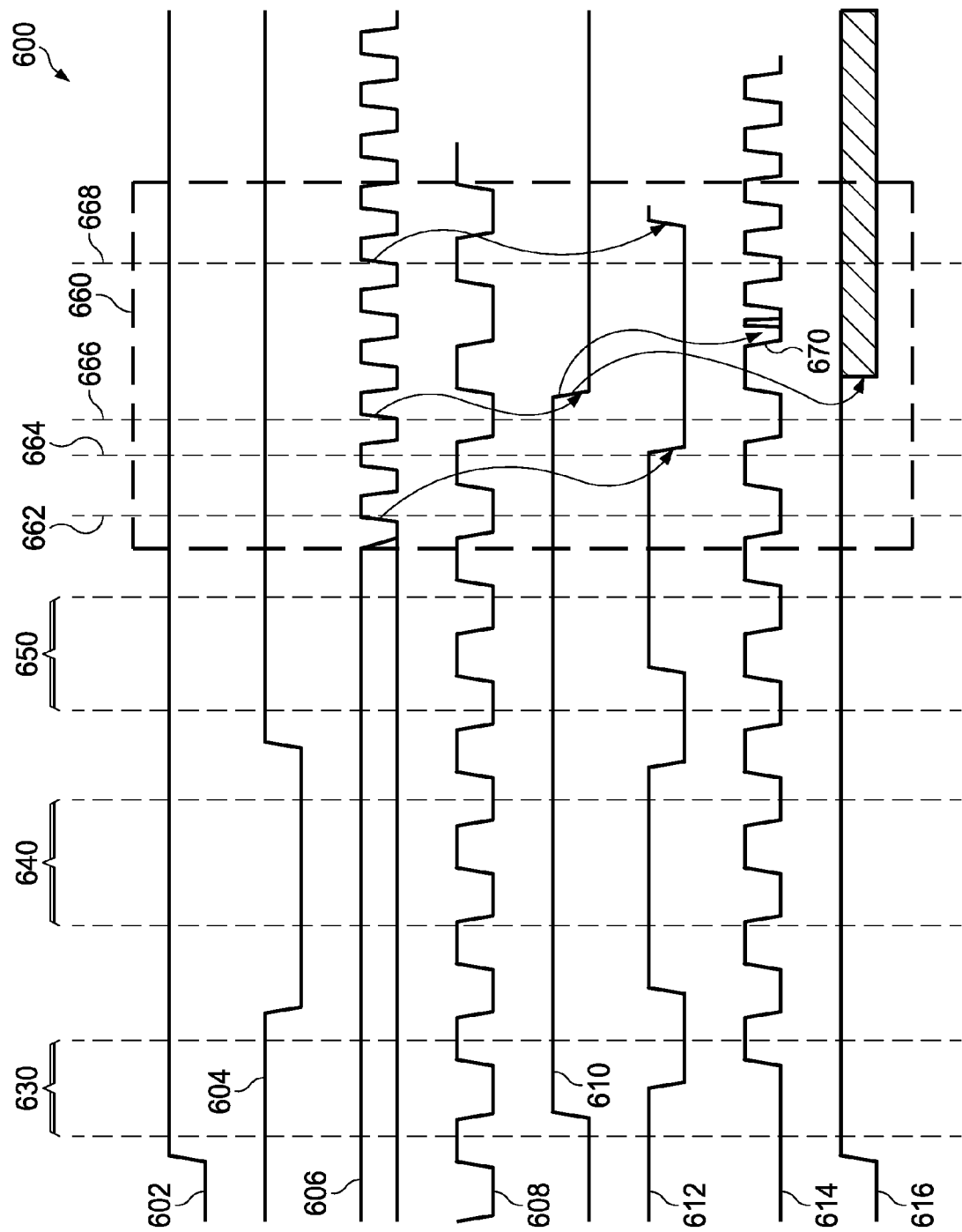
FIG. 6 is a timing diagram illustrating signals at various nodes of a circuit for asymmetric ageing prevention, according to another embodiment.

FIG. 6 is a timing diagram 600 depicting the details of signals at various nodes of an asymmetric ageing prevention circuit, for example, the circuits 100 and 200, in accordance with various embodiments. Various indicative transitions of signals at various nodes of the asymmetric ageing prevention circuit are represented at various clock instances. For example, the timing diagram 600 represents the signals, such as a power signal 602, a power-on-reset (PORZ) signal 604, a sysclk signal 606, a secondary clock signal (roclk) 608, a safemode signal 610, a IP_reset signal 612, a IP_clk signal 614, and an IC control (IC_cntrl) signal 616.

The timing diagram 600 is split into four time zones or time durations, for example, time durations 630, 640, 650 and 660, so as to illustrate various scenarios/concerns associated with asymmetric ageing. For example, during the time duration 630, the IC is powered-on or activated so that the power signal 602 transitions from a low state to a high state. However, during the time duration 630, the PORZ signal 604 is still high, and has not transitioned to a low state. Accordingly, the current operating state of the IC is unknown. The unknown current operating state of the IC may lead to an asymmetric ageing condition in the IC.

During the second time duration, for example, during the time duration 640, the signal PORZ 604 has transitioned to a low state, thereby indicating the POR condition in the IC. However, the time duration 640, during which the PORZ signal 604 is in a low state, is too long. Such a condition may lead to an unknown operating state, or rather a constant state in the IC, which may lead to asymmetric ageing condition. This condition may be prevented by driving a preselected value of the clock in the IC so that a toggle may be implemented. The driving of a preselected clock value, for example, an override clock value, by an override control circuit in order to prevent an asymmetric ageing in the IC is explained herein with reference to FIG. 2.

During the time duration 650, the power is on (as indicated by the power signal 602), and the PORZ signal 604 is also in a high state. However, during the time period 650, the sysclk signal 606 is still in a low state, thereby indicating an absence of a generation of the primary clock signal 606 by the primary clock. As the toggle is not being performed during the time duration 650, the asymmetric ageing condition may prevail during the time period 650 as well. In order to prevent the asymmetric ageing condition, an exemplary circuit provided herein, such as, for example, the circuits 100 and 200, may be utilized.

A subsequent portion of the timing diagram corresponding to the time period 660 represents the signals at various nodes of the circuits, for example, the circuit 100 and 200, for asymmetric ageing prevention.

As illustrated in FIG. 6, when the power is on, the asymmetric ageing prevention circuit, for example, the circuits 100 and 200, may detect either of the conditions discussed with respect to the three timings, such as the time duration 630, the time duration 640, and/or the time duration 650. In case of any of these conditions, such as when an extended period of power-on, an extended period of PORZ, and/or a system clock missing condition are detected, the circuit, such as, for example, the circuit 100 or the circuit 200, facilitates the triggering of a safe operating mode in the IC. For example, as indicated by the safemode signal 610, whenever either of these three conditions prevails, the safe operating mode is triggered, and the safemode signal 610 transitions from a low state to a high state during any of these three conditions.

At instant 662, the sysclk is detected, which is indicated by the sysclk signal 606 changing from a low state to a high state. As the sysclk signal 606 is detected, the reset signal is de-asserted at instant 664, which is shown by the IP_reset signal 612 changing from a high state to a low state. At instant 666, after the elapse of a first predetermined time period (or a first predetermined number of system clock cycles) in the second state, the operation of IC is switched from the safe operating mode to a normal operating mode. For example, after an elapse of 94 clock cycles at instant 666 from the de-assertion of the reset signal at the instant 664, the safemode signal 610 is de-asserted. The de-assertion of the safemode signal 610 after an elapse of the first predetermined time period (or the first predetermined number of system clock cycles) is indicated by the transitioning of the safemode signal 610 from a high state to a low state.

In an embodiment, glitches may occur during a transition of the IC from the safe operating mode to the normal operating mode. For example, as illustrated by the arrow 670, a glitch may occur during the transition from the safe operating mode to the normal operating mode. However, the circuit 100 (or the circuit 200) enables a glitch-free transition to be achieved by keeping or maintaining the IP_reset in a low state for a second predetermined time period (or after an elapse of a second predetermined number of clock cycles) from the determination of the second operating state at instant 666. For example, the IP_reset signal changes from a low state to a high state after an elapse of the second predetermined number of clock cycles at instant 668. In an embodiment, the IP_reset signal changes state from a low state to a high state by asserting a wake-up signal. The assertion of a wake-up signal to perform the transition from the safe operating mode to the normal operating mode is explained in detail herein with reference to FIGS. 1 and 2.

Figure 7:
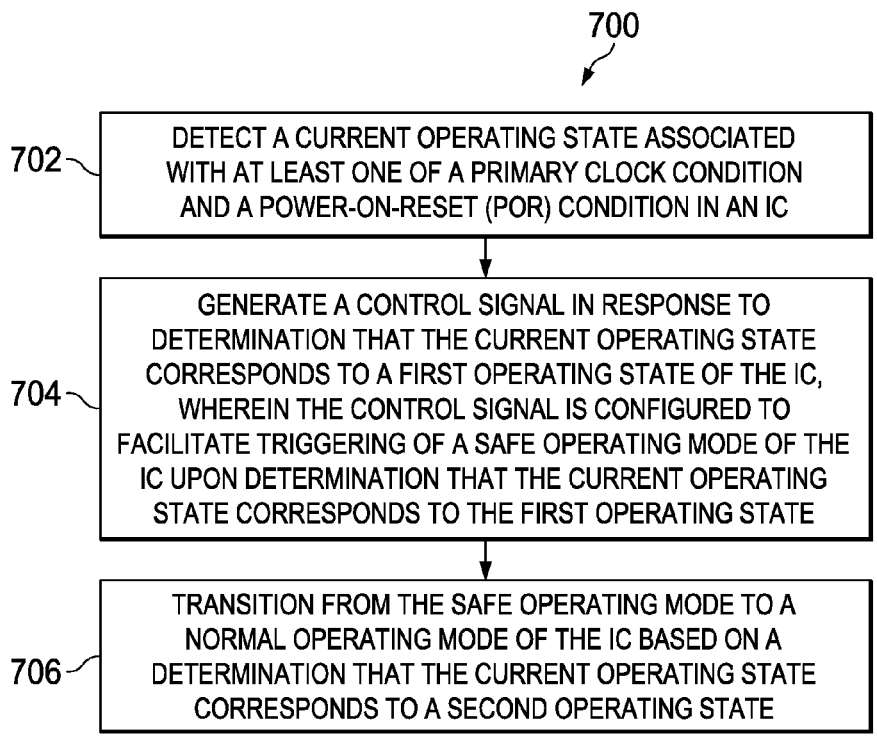
FIG. 7 is a flow diagram of a method of asymmetric ageing prevention according to an embodiment.

FIG. 7 is a flow diagram of a method 700 for asymmetric ageing prevention in an IC in accordance with an embodiment. The method 700 includes detecting an operating state of the IC associated with at least one of a POR condition and a primary (or reference) clock condition, and switching from the primary clock to a secondary clock in event of detection of an first current operating state of the IC. In certain embodiments, when the operating state of the IC is detected as first state, a control signal is generated. In certain embodiments, the control signal is configured to facilitate transitioning of the operation of the IC to a safe operating mode upon or subsequent to determination of the first state. For example, the method 700 includes facilitating switching to the secondary clock from the primary clock in case of detection of the first state of operation of the IC, wherein the secondary clock is associated with a safe operating mode of the IC. In certain embodiments, operations of method 700 are performed by a circuit configured for asymmetric ageing prevention (see FIG. 2).

At 704, the method 700 includes generating a control signal in response to determination of an first state of operation of the IC. In certain embodiments, the control signal is configured to facilitate triggering of a safe operating mode of the IC upon or subsequent to determination that the current operating state corresponds to the first operating state. In certain embodiments, the control signal is generated by a control circuit. An example of the control circuit is the control circuit 245 (see FIG. 2).

In various embodiments, the triggering of the safe operating state comprises switching from the primary clock signal to the secondary clock signal for provisioning to the IC. In certain embodiments, the triggering of the safe operating mode is performed upon or subsequent to elapse of a first predetermined time period following the determination that the current operating state corresponds to the second current operating state. In an exemplary embodiment, the first predetermined time period may be about 94 clock cycles of the primary clock. An example of the first predetermined time period is illustrated with reference to FIG. 6.

In an exemplary embodiment, the POR condition is prevented for the first predetermined time period following the determination that the current operating state corresponds to the second operating state. In certain embodiments, the POR condition is prevented by de-asserting a reset signal for the first predetermined time period.

At 706, the method 700 includes transitioning from the safe operating mode to a normal operating mode based on the determination of the current operating state as a second operating state. In certain embodiments, transitioning from the safe operating mode to the normal operating mode comprises asserting a wake-up signal after an elapse of a second predetermined time period following the determination that the current operating state corresponds to the second operating state for allowing the POR condition in the IC. In certain embodiments, the wake-up signal is generated by the control circuit, for example, the control circuit 245 (see FIG. 2). In an exemplary embodiment, the second predetermined time period is about 32 clock cycles of the primary clock. An example of the second predetermined time period is illustrated with reference to FIG. 6.

Figure 8:
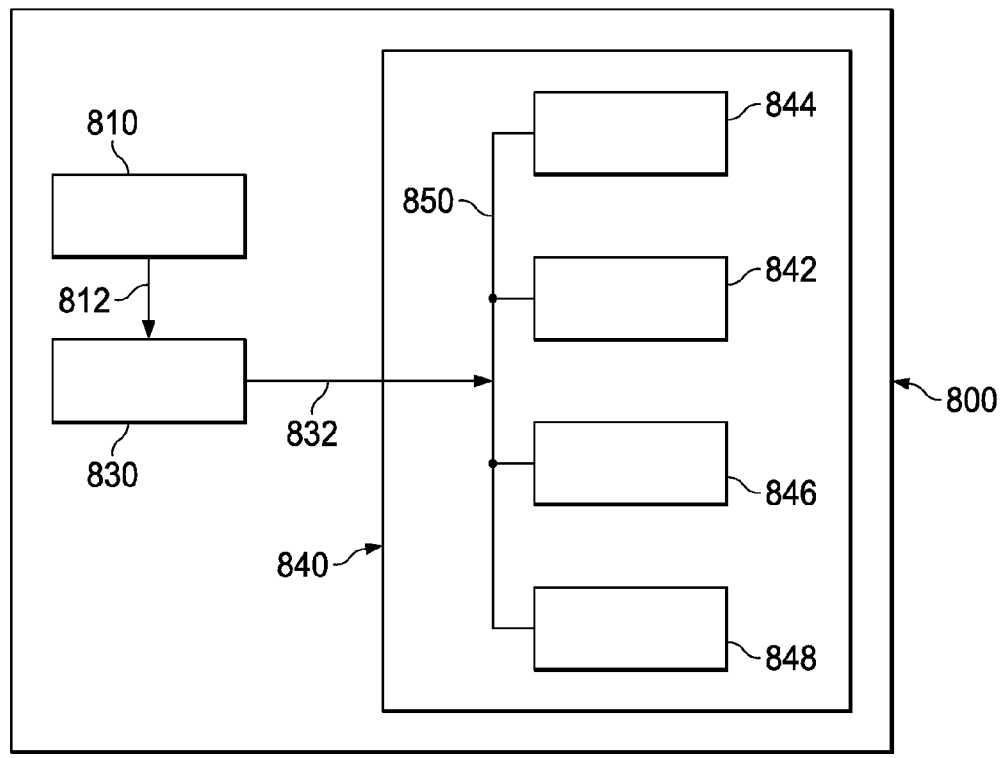
FIG. 8 illustrate a block diagram of an exemplary IC configured for asymmetric ageing prevention according to an embodiment.

FIG. 8 is a block diagram illustrating an IC 800 embodying an asymmetric ageing prevention circuit 810 in accordance with an embodiment. The asymmetric ageing prevention circuits 100 or 200 (explained with reference to FIGS. 1 and 2, respectively) may be implemented as the asymmetric ageing prevention circuit 810 in the IC 800. The asymmetric ageing prevention circuit 810 is configured to detect an first state of the IC 800 associated with the primary clock condition and a POR condition in the IC 800, and generate an output clock signal, for example a clock signal 812.

The IC 800 includes a clock interface circuit 830 coupled with or connected to the asymmetric ageing prevention circuit 810. The asymmetric ageing prevention circuit 810 is configured to distribute the output of the clock selection circuit and the reset circuit to a plurality of components associated with the IC 800. In an embodiment, the plurality of components 840 may include a processor 842, a memory 844, input/output (I/O) circuitry 846, and peripheral devices 848 coupled together by a system bus 850.

In event of a detection of the first state of the IC 800, the asymmetric ageing prevention circuit 810 is configured to determine current operating state as the first operating state, and in response, switch the operation of the IC 800 from the primary clock (for example, the reference clock) to a secondary clock. The secondary clock facilitates the asymmetric ageing prevention circuit 810 to generate an output clock signal that may be fed to other components of the IC 800. It is noted that the asymmetric ageing prevention circuit 810 may be an example of the asymmetric ageing prevention circuit 200, and accordingly various components of the asymmetric ageing prevention circuit 810 are similar in functionality to the corresponding components of the asymmetric ageing prevention circuits 100 and/or 200. In one embodiment, the logics for the asymmetric ageing prevention circuit 810 are supported by a programmable core of the IC 800.

It will be understood that the circuits, methods, timing diagrams, and description thereof that are explained herein with reference to the present disclosure for asymmetric ageing prevention, are generally set forth as an exemplary embodiment with respect to the state of various signals, such as PORZ, detectedPORZ, selfgenPORZ, ICCntrl or clock inactive states, and the like. The depicted operations and logical states of signals associated with said signals are indicative of at least one embodiment of the present disclosure. It should be appreciated, however, that the scope of the present disclosure includes operations and associated timing diagrams for said signals that are useful or similar in function, implementation logic disclosed herein, or effect thereof. Also, while the logical state (for example, '0' or '1') of various signals and variations thereof are disclosed in the description of circuits, methods and timing diagrams, they are understood not to limit the scope of the corresponding circuits, method(s) and/or timing diagrams associated with the disclosed concept.

In addition, certain states of signals such as PORZ, selfgenPORZ, ICCntrl or clock inactive states and other such signals are used to indicate the logical flow of the methods and corresponding signal change states at various nodes of the circuits. For instance, in various embodiments, the PORZ signal is assumed to be asserted at a logic state equal to '1'. However, in alternate embodiments, the PORZ signal may be assumed to be asserted at a logic state equal to '0'. In a similar manner, the states of various other signals may assume logic states that are vice-versa of the disclosed logic states for indicating same operations as described herein, without limiting the scope of the present disclosure.

Accordingly, the specifically disclosed operations, timing diagrams, signals at various nodes of the circuits and logical states thereof are provided to explain the flow of the methods and circuit implementation, and are understood not to limit the scope of the present disclosure. Moreover, the timing diagrams for signals having logic states that are vice-versa of the disclosed logic states have not been shown and explained herein for the sake of brevity of present disclosure.

Without in any way limiting the scope, interpretation, or application of the claims appearing below, a technical effect of one or more of the exemplary embodiments disclosed herein is to provide circuits and methods for asymmetric ageing prevention in ICs. Particularly, the disclosed circuits and methods facilitate in asymmetric ageing prevention when the POR condition and the clock condition in the IC are unknown. Moreover, the solution facilitates in asymmetric ageing prevention when the POR is asserted or the primary (or the system) clock is absent. In the event of said scenarios, the disclosed circuits and methods provide automatic control so as to switch over from a fail-safe operating mode to a normal operating mode, and vice versa.

The circuit configured for asymmetric ageing prevention includes a secondary clock. When the first state of the IC is detected, a slow speed clock is generated such that asymmetric ageing effects are minimized. In certain embodiments, the first state of the IC pertains to the detection of absence of the clock and/or relatively long periods of reset. The disclosed solution for asymmetric ageing prevention are independent of the state of the design, and hence can fit into any design independent of its functionality impact.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon or subsequent to these exemplary embodiments, it is noted that certain modifications, variations, and alternative constructions are apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A circuit configured for asymmetric ageing prevention, the circuit comprising:
    a primary clock configured to generate a primary clock signal;
    a secondary clock configured to generate a secondary clock signal;
    a state determination circuit coupled with the primary clock and the secondary clock, the state determination circuit configured to determine a current operating state associated with at least one of a primary clock condition and a power-on-reset (POR) condition in an integrated circuit (IC), the current operating state being one of a first operating state and an second operating state;
    a control circuit coupled with the state determination circuit and configured to generate a control signal in response to a determination that the current operating state corresponds to the first operating state, the control signal configured to facilitate a transition from the primary clock to the secondary clock upon or subsequent to the determination that the current operating state corresponds to the first operating state, the secondary clock being associated with a safe operating mode of the IC, and the control signal further configured to facilitate a transition from the safe operating mode to a normal operating mode upon or subsequent to a determination that the current operating state corresponds to the second operating state; and
a reset circuit coupled with the secondary clock and the control circuit, wherein the reset circuit is configured to prevent the POR condition until the determination that the current operating state corresponds to the second operating state,
    wherein, the first operating state comprises a low power operating state or an invalid operating state, and the second operating state comprises a power-on operating state or a valid operating state.

2. The circuit of claim 1, wherein the reset circuit is configured to prevent the POR condition for a first predetermined time period from the determination that the current operating state corresponds to the second operating state.

3. The circuit of claim 2, wherein the reset circuit is configured to prevent the POR condition by de-asserting a reset signal for the first predetermined time period.

4. The circuit of claim 3, wherein the reset circuit comprises:
    a safety reset generation circuit coupled with the secondary clock and the control circuit, the safety reset generation circuit configured to receive the control signal upon or subsequent to the determination that the current operating state corresponds to the first operating state, and output a safety reset signal;
    a multiplexer circuit coupled with the safety reset generation circuit and configured to receive the safety reset signal and a POR signal, the multiplexer circuit configured to select the safety reset signal as output upon or subsequent to the determination that the current operating state corresponds to the first operating state, and the POR signal upon or subsequent to the determination that the current operating state corresponds to the second operating state; and
    an AND gate coupled with the multiplexer circuit and the control circuit, the AND gate configured to logically AND the output of the multiplexer circuit and a wakeup signal received from the control circuit, and output the reset signal,
    wherein the wakeup signal is asserted after an elapse of a second predetermined time period from the determination that the current operating state corresponds to the second operating state for allowing the POR condition in the circuit, asserting the wakeup signal being configured to perform the transition from the safe operating mode to the normal operating mode of the IC.

5. The circuit of claim 2, wherein the state determination circuit comprises:
    a self-reset generation circuit is coupled with the secondary clock and configured to generate an internal reset signal at every edge of the secondary clock;
    a PORZ detection circuit coupled with the self-reset generation circuit and configured to detect generation the POR condition based on the internal reset signal; and
    a clock absent detection circuit coupled with the self-reset generation circuit, and configured to detect the clock absent condition based on the internal reset signal.

6. The circuit of claim 2, further comprising:
    a clock selection circuit coupled with the primary clock, the secondary clock and the control circuit, the clock selection circuit configured to select the primary clock signal as output upon or subsequent to determination that the current operating state corresponds to the second operating state, and select the secondary clock signal upon or subsequent to determination that the current operating state corresponds to the first operating state based on the control signal; and
    an override control circuit coupled with the control circuit, the override control circuit configured to receive a current signal, an override signal, and the control signal, and output one of the current signal and the override signal based on a selection performed by the control signal, wherein the current signal is associated with the second operating state, and the override signal is associated with the first operating state.

7. The circuit of claim 6, wherein the override signal is configured to prevent a change of state of a plurality of peripheral circuits associated with the IC during the low power operating state.

8. A method of asymmetric ageing prevention, the method comprising:
    detecting a current operating state associated with at least one of a primary clock condition and a power-on-reset (POR) condition in an integrated circuit (IC), the current operating state being one of a second operating state and a first operating state;
    generating a control signal in response to a determination that the current operating state corresponds to the first operating state, the control signal configured to facilitate a triggering of a safe operating mode of the IC upon or subsequent to the determination that the current operating state corresponds to an invalid operating state; and transitioning from the safe operating mode to a normal operating mode of the IC based on a determination that the current operating state corresponds to the second operating state, wherein the first operating state comprises a low power operating state or the invalid operating state, and the second operating state comprises a power-on operating state or a valid operating state, wherein the invalid operating state associated with the primary clock condition comprises determination of absence of the primary clock signal.

9. The method of claim 8, wherein the invalid operating state of the IC associated with the POR condition comprises an extended time duration of a reset assertion in the IC.

10. The method of claim 8, wherein triggering of safe operating mode comprises switching from a primary clock signal to a secondary clock signal for provisioning to the IC.

11. The method of claim 10, wherein triggering the safe operating mode is performed upon or subsequent to elapse of a first predetermined time period from the determination of the second operating state.

12. The method of claim 11 further comprising preventing the POR condition for the first predetermined time period from the determination that the current operating state corresponds to the second operating state, wherein the POR condition is prevented by de-asserting a reset signal for the first predetermined time period.

13. The method of claim 8, wherein transitioning from the safe operating mode to the normal operating mode comprises asserting a wakeup signal after an elapse of a second predetermined time period from the determination that the current operating state corresponds to the second operating state for allowing the POR condition in the IC.

14. The method of claim 8, further comprising outputting one of a current signal and an override signal based on a selection performed by the control signal, wherein the current signal is associated with the second operating state, and the override signal is associated with the first operating state, wherein the override control signal is configured to prevent a change of state of a plurality of peripheral circuits associated with the IC during the first operating state.

15. An integrated circuit (IC) configured for asymmetric ageing prevention, the circuit comprising:
an asymmetric ageing prevention circuit comprising:
a primary clock configured to generate a primary clock signal;
a secondary clock configured to generate a secondary clock signal;
a state determination circuit coupled with the primary clock and the secondary clock, the state determination circuit configured to determine a current operating state associated with at least one of a primary clock condition and a power-on-reset (POR) condition in an integrated circuit (IC), the current operating state being one of a second operating state and an first operating state;
a control circuit coupled with the state determination circuit and configured to generate a control signal in response to a determination that the current operating state corresponds to the first operating state, the control signal configured to facilitate a transition from the primary clock to the secondary clock upon or subsequent to the determination that the current operating state corresponds to the first operating state, the secondary clock being associated with a safe operating mode of the IC, and the control signal further configured to facilitate a transition from the safe operating mode to a normal operating mode upon or subsequent to a determination that the current operating state corresponds to the second operating state, the first operating state comprising a low power operating state or an invalid operating state, and the second operating state comprising a power-on operating state or a valid operating state;
a reset circuit coupled with the secondary clock and the control circuit, the reset circuit configured to prevent the POR condition until the determination that the current operating state corresponds to the second operating state; and
a clock selection circuit coupled with the primary clock, the secondary clock and the control circuit, the clock selection circuit configured to select the primary clock signal as an output upon or subsequent to the determination that the current operating state corresponds to the second operating state, and the clock selection circuit further configured to select the secondary clock signal upon or subsequent to the determination that the current operating state corresponds to the first operating state based on the control signal; and a clock interface circuit coupled with the asymmetric ageing prevention circuit and configured to distribute the output to a plurality of components associated with the IC.

16. The integrated circuit of claim 15, wherein the reset circuit is configured to:
prevent the POR condition for a first predetermined time period from the determination that the current operating state corresponds to the second operating state.

17. The integrated circuit of claim 16, wherein the reset circuit comprises:
a safety reset generation circuit coupled with the secondary clock and the control circuit, the safety reset generation circuit configured to receive the control signal upon or subsequent to the determination that the current operating state corresponds to first operating state, and output a safety reset signal;
a multiplexer circuit coupled with the safety reset generation circuit and configured to receive the safety reset signal and a POR signal, the multiplexer circuit configured to select the safety reset signal as output upon or subsequent to the determination that the current operating state corresponds to the first operating state, and the POR signal upon or subsequent to the determination that the current operating state corresponds to the second operating state; and
an AND gate coupled with the multiplexer circuit and the control circuit, the AND gate configured to logically AND the output of the multiplexer circuit and a wakeup signal received from the control circuit, and output the reset signal,
wherein the wakeup signal is asserted after an elapse of a second predetermined time period from the determination that the current operating state corresponds to the second operating state for allowing the POR condition in the circuit, asserting the wakeup signal being configured to perform the transition from the safe operating mode to the normal operating mode of the IC.

18. The integrated circuit of claim 15, further comprising an override control circuit coupled with the control circuit, the override control circuit configured to receive a current signal, an override signal, and the control signals, and output one of the current signal and the override signal based on a selection performed by the control signal, wherein the current signal is associated with the second operating state, and the override signal is associated with the invalid operating state, and wherein the override control signal is configured to prevent a change of state of a plurality of peripheral circuits associated with the IC during the invalid operating state.

* * * * *